(12) United States Patent
Scalici et al.

(10) Patent No.: US 10,197,106 B2
(45) Date of Patent: Feb. 5, 2019

(54) FRICTION CLUTCH FOR A VEHICLE TRANSMISSION

(71) Applicant: OERLIKON GRAZIANO S.p.A, Rivoli (Turin) (IT)

(72) Inventors: Giorgio Scalici, Alessandria (IT); Fabio Filippo Irato, Messina (IT)

(73) Assignee: OERLIKON GRAZIANO S.p.A., Rivoli (Turin) (IT)

( * ) Notice: Subject to any disclaimer, the term of this patent is extended or adjusted under 35 U.S.C. 154(b) by 0 days.

(21) Appl. No.: 15/466,509

(22) Filed: Mar. 22, 2017

(65) Prior Publication Data
US 2017/0276189 A1 Sep. 28, 2017

(30) Foreign Application Priority Data

Mar. 22, 2016 (IT) .......................... 102016000029697

(51) Int. Cl.
| | |
|---|---|
| *F16D 13/56* | (2006.01) |
| *F16D 13/50* | (2006.01) |
| *F16D 13/58* | (2006.01) |

(52) U.S. Cl.
CPC ............ *F16D 13/56* (2013.01); *F16D 13/50* (2013.01); *F16D 13/58* (2013.01); *F16D 13/583* (2013.01); *F16D 2300/24* (2013.01)

(58) Field of Classification Search
CPC .......... F16D 13/56; F16D 13/50; F16D 13/58; F16D 13/583; F16D 2300/24
See application file for complete search history.

(56) References Cited

U.S. PATENT DOCUMENTS

2007/0204709 A1 9/2007 Mesiti et al.
2010/0212440 A1* 8/2010 Thery ................. F16D 21/06
74/330

(Continued)

FOREIGN PATENT DOCUMENTS

EP 1801441 A1 6/2007

OTHER PUBLICATIONS

Search Report and Opinion issued by the Italian Patent and Trademark Office in connection with Italian Patent Application No. 102016000029697, dated Jan. 3, 2017.

*Primary Examiner* — Jacob S. Scott
*Assistant Examiner* — Tinh Dang
(74) *Attorney, Agent, or Firm* — Meunier Carlin & Curfman LLC

(57) ABSTRACT

The friction clutch comprises: a driving part comprising at least one first friction element; a driven part comprising a hub and at least one second friction element drivingly connected for rotation with the hub; at least one spring configured to press the friction elements of the driving part and of the driven part against each other by applying an elastic force on these friction elements; and an actuation unit arranged to bring about opening of the friction clutch by applying directly or indirectly on the at least one spring an actuating force directed in the opposite direction to the elastic force so as to move the friction elements away from each other. The actuation unit comprises a thrust bearing, at least one force transmission member and a hollow actuating member arranged to apply the actuating force on the at least one spring via the thrust bearing and the at least one force transmission member. The hollow actuating member is arranged on the opposite side of the hub to the at least one spring. The at least one force transmission member extends through the hub.

7 Claims, 3 Drawing Sheets

(56) References Cited

U.S. PATENT DOCUMENTS

| | | | |
|---|---|---|---|
| 2013/0081918 A1 | 4/2013 | Wilton et al. | |
| 2015/0252890 A1* | 9/2015 | Singh | F16D 25/087 475/269 |
| 2015/0260236 A1* | 9/2015 | Inayama | F16D 13/56 192/70.12 |
| 2015/0377303 A1* | 12/2015 | Adachi | F16D 13/54 192/70.27 |

* cited by examiner

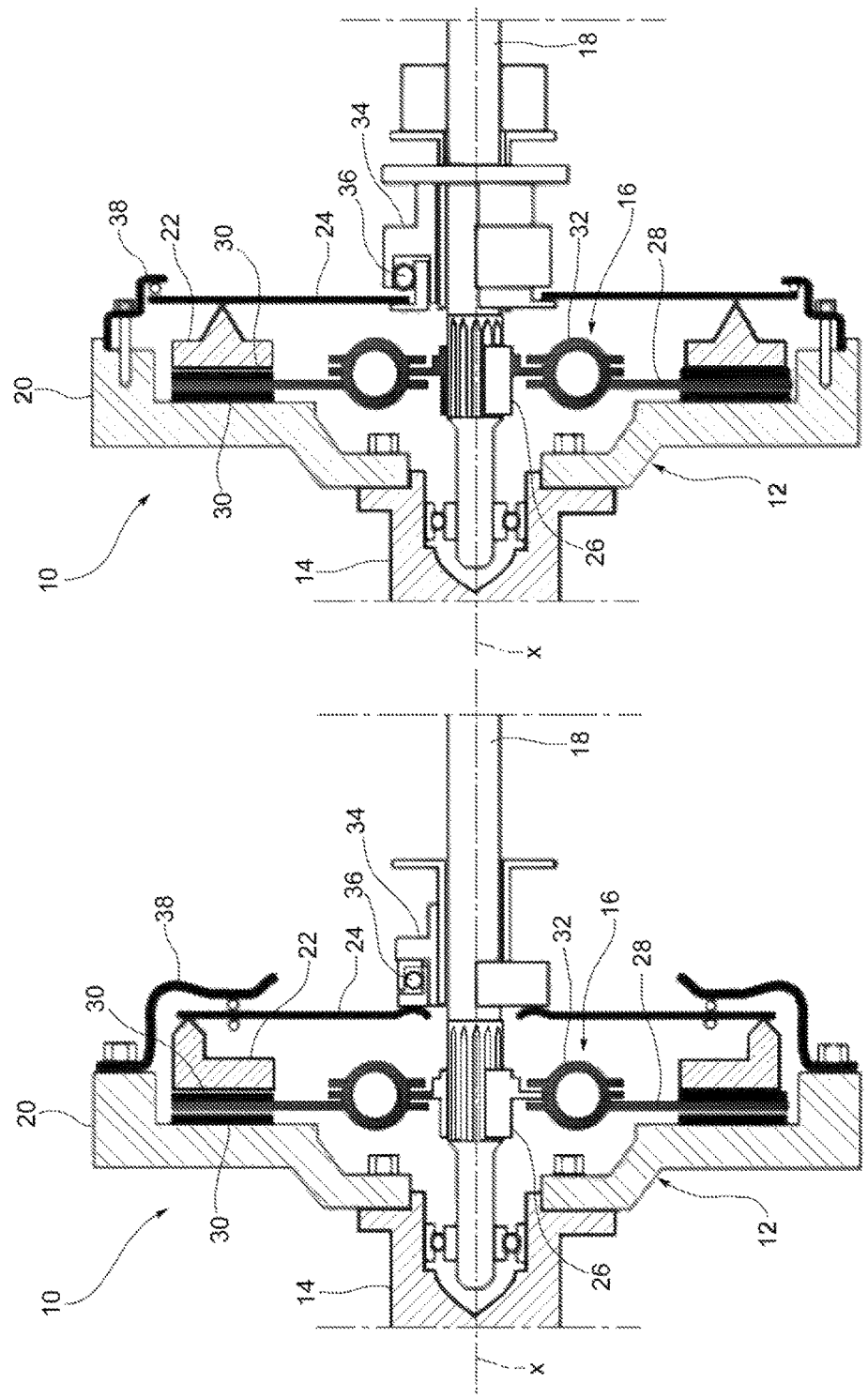

FRICTION CLUTCH FOR A VEHICLE TRANSMISSION

BACKGROUND OF THE INVENTION

The present invention relates in general to a friction clutch for releasably coupling a first rotating member with a second rotating member, which rotating members are arranged coaxially to each other so as to rotate about the same axis of rotation, in order to allow transmission of torque between these rotating members. The friction clutch of the present invention is intended for use in particular, although not exclusively, in a motor-vehicle transmission to releasably couple a crankshaft of an engine of the vehicle with an input shaft, or primary shaft, of a gearbox of the vehicle.

More specifically, the present invention relates to a friction clutch of the so called normally-engaged type, i.e. a friction clutch where the driving part and the driven part are normally coupled with each other so as to allow transmission of torque between these parts and where opening of the friction clutch, that is to say, disconnection of the driving part from the driven part, must be brought about by means of an actuation unit.

With reference to FIGS. 1 and 2 of the attached drawings, a typical example of friction clutch for a motor-vehicle transmission is generally indicated 10 and basically comprises a driving part 12 arranged to be permanently connected for rotation with a crankshaft 14, usually via a flywheel (not shown), and a driven part 16 arranged to be permanently connected for rotation with an input shaft, or primary shaft, 18 of the gearbox. The driving part 12 comprises a clutch bell 20, a clutch pressure member 22 which is drivingly connected for rotation with the clutch bell 20 and is axially (i.e. along the direction of the axis of rotation, indicated x, of the clutch bell 20) movable relative to the clutch bell 20, and a spring 24 (in the present case a disc spring) configured to normally act on the clutch pressure member 22 to urge it towards the clutch bell 20. The driven part 16 comprises a hub 26, drivingly connected for rotation with the input shaft 18 (to which it is connected for example by splined coupling), and a driven disc 28, which is provided on both its faces with friction linings 30 and is connected to the hub 26 via a torsional damper 32 (typically formed by coupling springs). By virtue of the elastic force applied by the spring 24 on the clutch pressure member 22, the driven disc 28 is axially clamped between the clutch bell 20 on one side and the clutch pressure member 22 on the opposite side. Therefore, the driven part 16, and hence also the input shaft 18 of the gearbox, is normally connected for rotation with the driving part 12, and hence with the crankshaft 14, as a result of the friction force between the friction linings 30 on the two sides of the driven disc 28 and the corresponding faces of the clutch bell 20 and of the clutch pressure member 22. In order to allow the driving part 12 to be disconnected from the driven part 16, the friction clutch 10 is provided with an actuation unit comprising an actuator (not shown), such as for example a hydraulic actuator, and an actuating mechanism driven by the actuator. The actuating mechanism comprises an actuating member 34 which is axially slidable and is arranged to act, via a thrust bearing 36, on the radially innermost edge of the spring 24 so as to move the spring 24 away from the clutch pressure member 22.

Depending on the arrangement of the spring 24 and of the clutch pressure member 22 two different configurations of the friction clutch are possible, namely a "push" configuration, as shown in FIG. 1, and a "pull" configuration, as shown in FIG. 2.

With reference to FIG. 1, in the push configuration the spring 24 is hinged in a radially intermediate point thereof to a cover 38 attached to the clutch bell 20 and, in normal operating conditions (i.e. with the actuating member 34 in the non-operative position), rests with its radially outermost edge against the clutch pressure member 22. The spring 24 acts therefore on the clutch pressure member 22 in a radially outer point with respect to the point where the spring is hinged to the cover 38. In this case, in order to open (i.e. disengage) the friction clutch, the actuating member 34, and hence the thrust bearing 36, must be pushed towards the clutch pressure member 22 (that is to say, towards the clutch bell 20). Acting on the radially innermost edge of the spring 24, the actuating member 34 causes therefore the radially outermost edge of the spring 24 to move away from the clutch pressure member 22.

With reference to FIG. 2, in the pull configuration the spring 24 is hinged, on the other hand, at its radially outermost edge to the cover 38 (which in this case has smaller sizes than in the push configuration), or directly to the clutch bell 20, and, in normal operating conditions (i.e. with the actuating member 34 in the non-operative position), rests at a radially intermediate point thereof against the clutch pressure member 22. The spring 24 acts therefore on the clutch pressure member 22 in a radially inner point than the point where the spring is hinged to the cover 38. In this case, in order to open (i.e. disengage) the friction clutch, the actuating member 34, and hence the thrust bearing 36, must be pulled on the opposite side of the clutch pressure member 22 (that is to say, of the clutch bell 20). In this way, acting on the radially innermost edge of the spring 24, the actuating member 34 causes the above-mentioned radially intermediate point of the spring 24 to move away from the clutch pressure member 22.

In both the configurations shown in FIGS. 1 and 2 the spring 24 is arranged on the opposite side of the hub 26 to the clutch bell 20.

As is known, a plurality of helical springs may be provided instead of a disc spring. Anyway, also in this case the friction clutch may have a push or pull configuration as explained above with reference to the use of a disc spring as elastic means to normally keep the friction clutch in the closed (i.e. engaged) position.

Both the push configuration and the pull configuration have advantages and disadvantages.

The main advantages of the push configuration are that the friction clutch is easy to assemble and disassemble and—in case of use of a disc spring as elastic means—that the thrust bearing acting on the disc spring has a simple structure. On the other hand, the main disadvantages of this configuration are—in case of use of a disc spring as elastic means—the flexibility of the cover to which the disc spring is hinged and the axial play at the point where the disc spring is hinged to the cover.

The main advantages of the pull configuration are—in case of use of a disc spring as elastic Means—that the lever arm with which the actuating member acts on the spring via the thrust bearing is larger than in the push configuration, which allows to reduce the force that must be applied by the actuating member, the force on the clutch pressure member remaining unchanged, and that the cover may be omitted, since the spring may be hinged directly to the clutch bell. The main disadvantages of this configuration are, on the other hand, that the friction clutch is more difficult to assemble and disassemble and that the thrust bearing has a more complicated structure.

A friction clutch according to the preamble of independent claim 1 is known from EP 1 801 441 A1. According to the configuration known from this prior art document, the actuating force required to open the friction clutch is transmitted by an actuating member to a plurality of cylindrical helical springs arranged at a distance from each other at the periphery of the clutch bell via a thrust bearing and a bell-shaped force transmission member which extends radially beyond the outermost radius of the friction linings. Such a configuration of the friction clutch has therefore large radial sizes.

SUMMARY OF THE INVENTION

It is an object of the present invention to provide a friction clutch which has both the advantages of the push configuration and those of the pull configuration, and is therefore easy to assemble and disassemble and—in case of use of a disc spring as elastic means—allows to apply the actuating force on the disc spring with a large lever arm and does not require a cover to which the disc spring is to be hinged.

A further object of the present invention is to provide a friction clutch which is radially more compact than the prior art discussed above.

These and other objects are fully achieved according to the present invention by virtue of a friction clutch as described and claimed herein.

In short, the invention is based on the idea of providing a normally-engaged friction clutch, i.e. a friction clutch where the friction elements of the driving part and of the driven part of the friction clutch are normally pressed against each other by the elastic force applied on these elements by elastic means and, in order to allow opening of the friction clutch, are moved away from each other by applying on said elastic means, through actuator means arranged on the same side as the friction elements, an actuating force directed in the opposite direction to said elastic force, wherein said actuator means comprise a thrust bearing, at least one force transmission member and a hollow actuating member arranged to act on said elastic means via the thrust bearing and said at least one force transmission member, wherein the actuating member is arranged on the opposite side of a hub of the driven part of the friction clutch to said elastic means and wherein said at least one force transmission member extends through said hub. By virtue of the actuating force being transmitted from the actuating member to the elastic means via a thrust bearing and one or more force transmission members which extend through the hub of the driven part, and which are therefore placed radially within the outermost radius of the friction elements, the friction clutch of the invention is radially more compact than the prior art, as well as easy to assemble and disassemble.

BRIEF DESCRIPTION OF THE DRAWINGS

Further features and advantages of the present invention will become apparent from the following detailed description, given purely by way of non-limiting example with reference to the appended drawings, where:

FIG. 1 is an axial section view schematically showing a friction clutch for a motor-vehicle transmission having a push configuration;

FIG. 2 is an axial section view schematically showing a friction clutch for a motor-vehicle transmission having a pull configuration;

DETAILED DESCRIPTION OF PREFERRED EMBODIMENTS

Figure 3:
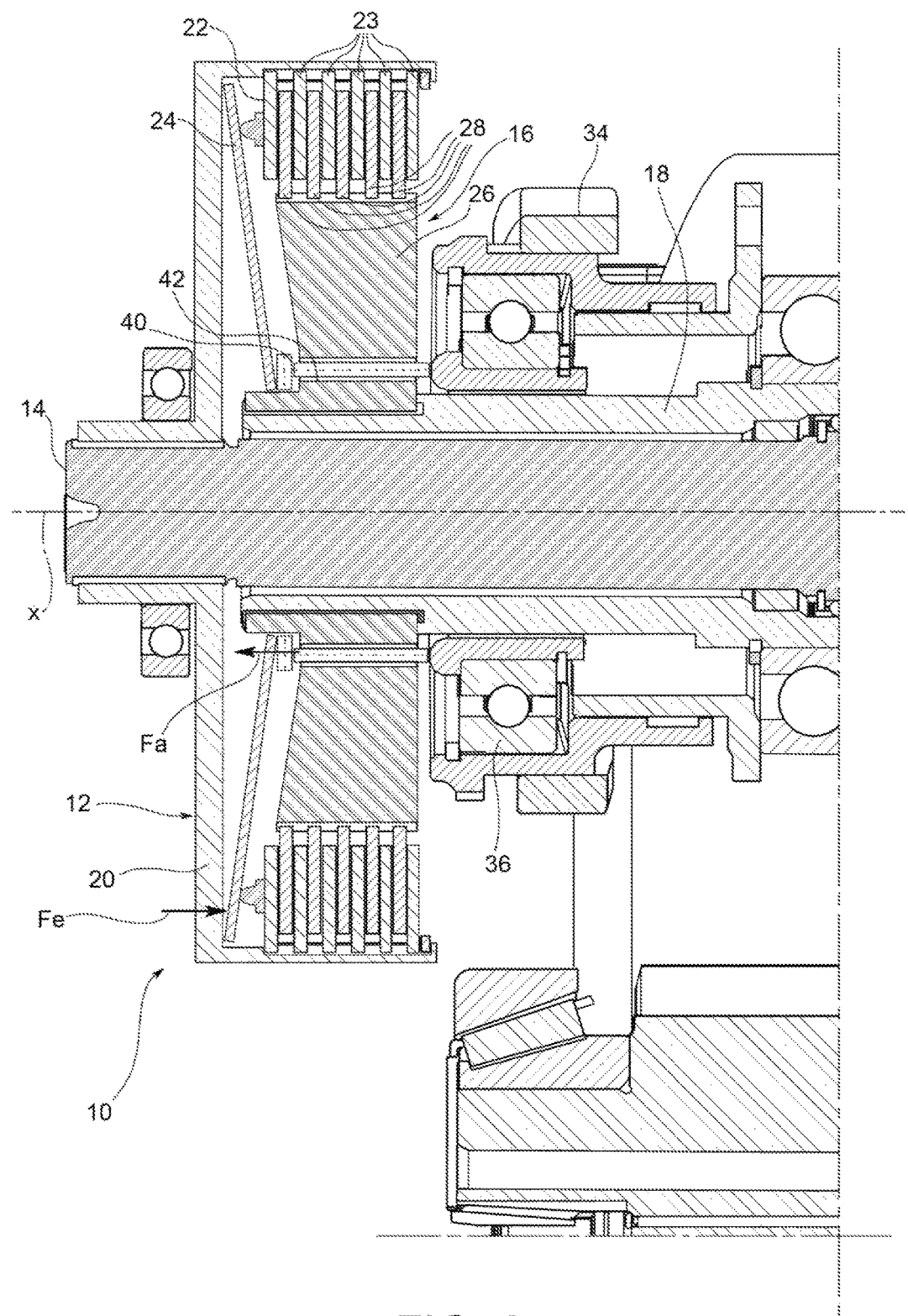
FIG. 3 is an axial section view of a friction clutch for a motor-vehicle transmission according to an embodiment of the present invention.

With reference first to FIG. 3, where parts and elements identical or corresponding to those of FIGS. 1 and 2 are given the same reference numbers, a friction clutch for a motor-vehicle transmission according to an embodiment of the present invention is generally indicated 10. Although the invention is described and illustrated here with specific reference to a friction clutch for a motor-vehicle transmission, the invention is to be intended as referring in general to any friction clutch, irrespective of the specific field of application, provided the friction clutch is of the normally-engaged type.

In the embodiment shown in FIG. 3 the friction clutch 10 is made as a multi-disc wet friction clutch. The invention is not however limited to this specific type of friction clutch, but might also be applied to a single-disc friction clutch, instead of a multi-disc one, and/or to a dry friction clutch, instead of a wet one.

The friction clutch 10 basically comprises a driving part 12 arranged to be permanently connected for rotation with a crankshaft 14, and a driven part 16 arranged to be permanently connected for rotation with an input shaft, or primary shaft, 18 of the gearbox, which is coaxial to the crankshaft 14 so as to rotate about the same axis of rotation, indicated x. In broader terms, the friction clutch comprises a driving part 12 and a driven part 16 which are arranged to be permanently connected for rotation with a first rotating member (in this case the crankshaft 14) and with a second rotating member (in this case the input shaft 18), respectively, wherein the first and second rotating members are coaxial to each other so as to rotate about the same axis of rotation. In the illustrated example, the two shafts 14 and 18 are arranged at least partially within each other, but this arrangement is not necessary for the invention.

The driving part 12 comprises a clutch bell 20, a clutch pressure member 22 which is drivingly connected for rotation with the clutch bell 20 and is axially movable (i.e. movable along the direction of the axis of rotation x) relative to the clutch bell 20, a plurality of driving discs 23 which are drivingly connected for rotation with the clutch bell 20, and a disc spring 24 configured to act on the clutch pressure member 22 so as to push it towards the driving discs 23. $F_e$ indicates in FIG. 3 the elastic force applied by the disc spring 24 on the clutch pressure member. This force is directed to the right, with respect to the point of view of a person observing FIG. 3.

The driven part 16 comprises a hub 26 drivingly connected for rotation with the input shaft 18 (to which it is connected for example by splined coupling), and a plurality of driven discs 28 which are each arranged between a pair of adjacent driving discs 23 and are drivingly connected for rotation with the hub 26. Due to the elastic force $F_e$ applied by the disc spring 24 on the clutch pressure member 22, the driven discs 28 are axially clamped between the driving discs 23, thereby allowing transmission of torque by friction between the driving part 12 and the driven part 16, and hence between the crankshaft 14 and the input shaft 18 of the gearbox.

The arrangement of the disc spring 24 is like the one described above with reference to the pull configuration (FIG. 1), in that the disc spring 24 is hinged to the clutch bell 20 at its radially outermost edge and acts on the clutch pressure member 22 in a radially intermediate point thereof. The disc spring 24 is configured to act on the clutch pressure member 22 so as to keep the driving discs 23 and the driven discs 28 pressed against each other. The friction clutch 10 is therefore normally closed, i.e. normally engaged.

The friction clutch 10 further comprises an actuation unit arranged to bring about opening (i.e. disengagement) of the friction clutch. The actuation unit comprises an actuator (not shown, but of per-se-known type), such as for example a hydraulic actuator, and an actuating mechanism driven by the actuator. The actuating mechanism comprises a thrust bearing 36 mounted in axially slidable manner on the primary shaft 18, and an actuating member 34 arranged to act on the thrust bearing 36 so as to push it axially towards the disc spring 24. The actuating member 34 is made as a hollow member and is passed through by the two shafts 14 and 18 (in broader terms, by at least one of the two shafts). Both the thrust bearing 36 and the actuating member 34 are therefore placed around the two shafts 14 and 18, that is to say, radially outwardly with respect to these shafts.

The thrust bearing 36 is in turn arranged to act on the radially innermost edge of the disc spring 24 via at least one force transmission member extending through the hub 26, for example via a plurality of pins 40 which extend through respective axial through holes 42 provided in the hub 26, so as to move the disc spring 24 away from the clutch pressure member 22 and therefore cancel the axial load applied by the clutch pressure member 22 on the assembly formed by the driving discs 23 and the driven discs 28. The actuating force applied by the actuation unit on the disc spring 24 to bring about opening of the friction clutch is indicated with $F_a$ in FIG. 3. This force is directed in the opposite direction to the elastic force $F_e$ (i.e. to the left, with respect to the point of view of a person observing FIG. 3).

According to a variant embodiment, not shown, the thrust bearing is placed on the same side of the hub as the disc spring so as to be able to act directly on the radially innermost edge of the disc spring, and is operated by the actuating member via at least one force transmission member extending through the hub 26, for example via pins extending through respective axial through holes provided in the hub.

The way the friction clutch 10 is actuated is therefore like the one described above with reference to the push configuration (FIG. 2), in that the thrust bearing 36 is pushed by the actuating member 34 towards the clutch bell 20 to bring about opening of the friction clutch.

Figure 4:
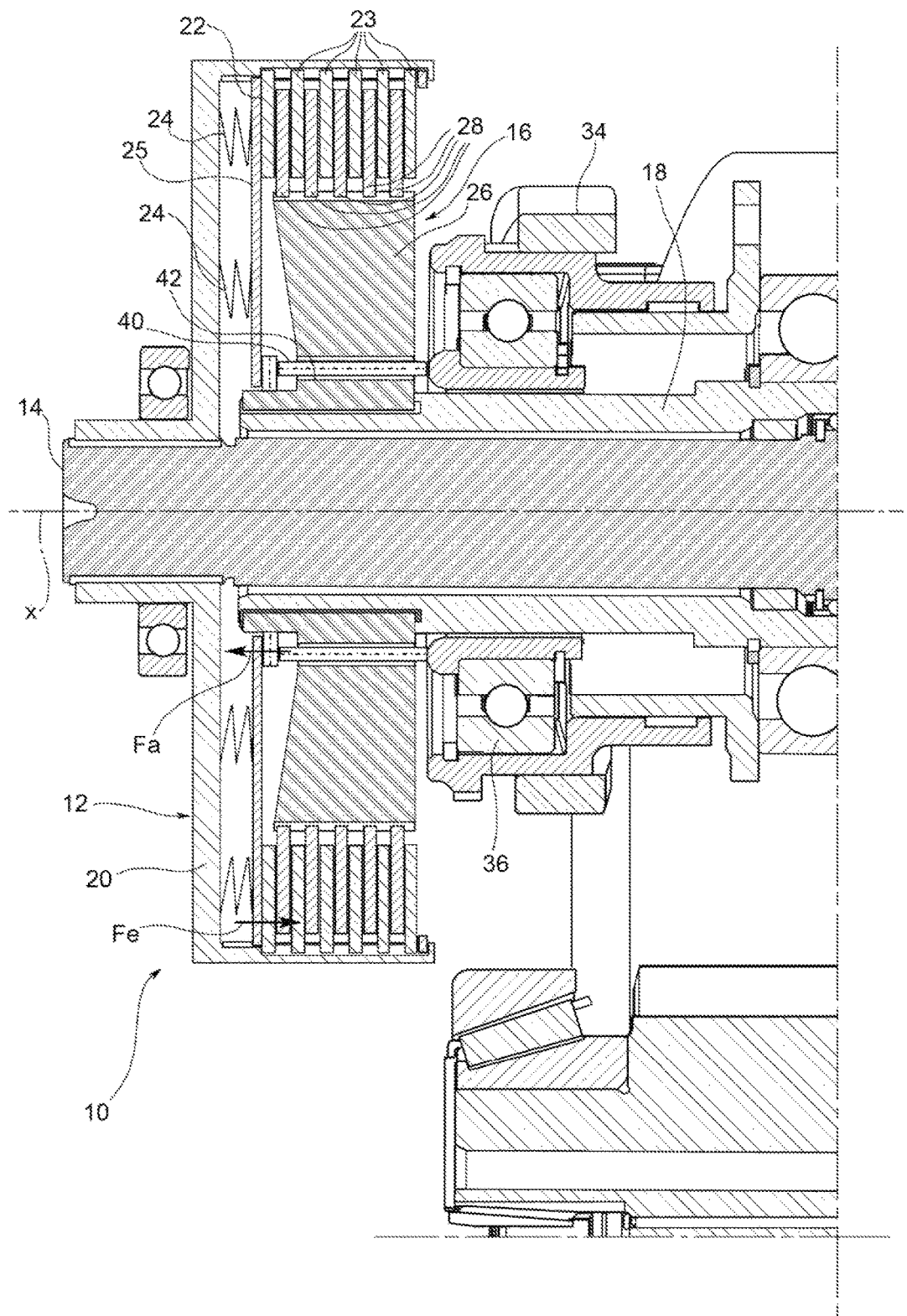
FIG. 4 is an axial section view of a friction clutch for a motor-vehicle transmission according to a further embodiment of the present invention.

A further embodiment of the friction clutch according to the invention is shown in FIG. 4, where parts and elements identical or corresponding to those of FIG. 3 are given the same reference numbers.

This further embodiment differs from the one described above with reference to FIG. 3 substantially only in that helical springs (also indicated 24) are provided, instead of a disc spring, each helical spring resting at a first end thereof against the clutch bell 20 and at the opposite end against a plate 25 rigidly connected to the clutch pressure member 22. The springs 24 apply on the plate 25, and via the latter on the clutch pressure member 22, an elastic force $F_e$ which is directed to the right with respect to the point of view of a person observing FIG. 4. The actuation unit applies on the plate 25, and hence on the clutch pressure member 22, an actuating force $F_a$ which is directed in the opposite direction to the elastic force $F_e$ applied on the plate 25 by the springs 24. Apart from that, the other features of the friction clutch are the same as those explained above in connection with the embodiment of FIG. 3.

In the embodiments described above with reference to FIGS. 3 and 4, the gearbox and the engine of the vehicle are arranged on the same side of the friction clutch, with the actuation unit of the friction clutch adjacent to the gearbox. It is however also possible to place the friction clutch between the engine and the gearbox, the actuation unit of the friction clutch being adjacent indifferently to the gearbox or the engine.

As is clear from the above description, the friction clutch according to the invention has an arrangement of the disc spring like that of a pull-type friction clutch, but an actuation system like that of a push-type friction clutch, and allows therefore to offer at the same time the above-mentioned advantages offered by the pull configuration along with the above-mentioned advantages offered by the push configuration. Furthermore, since the actuating force is transmitted to the spring(s) through the hub of the driven part, the friction clutch is radially more compact than the prior art.

Naturally, the principle of the invention remaining unchanged, the embodiments and constructional details may be greatly varied with respect to those described and illustrated here purely by way of a non-limiting example, without thereby departing from the scope of the invention as defined in the accompanying claims.

What is claimed is:

1. A friction clutch for releasably connecting to each other a first rotating member and a second rotating member, which are arranged coaxial to each other so as to be able to rotate about a same axis of rotation, to allow transmission of torque between said first and second rotating members, the friction clutch comprising
a driving part arranged to be permanently connected for rotation with said first rotating member, the driving part comprising at least one first friction element,
a driven part arranged to be permanently connected for rotation with said second rotating member, the driven part comprising a hub and at least one second friction element drivingly connected for rotation with the hub,
at least one elastic element configured to press said at least one first friction element and at least one second friction element against each other by applying an elastic force on said friction elements, and
an actuation unit arranged to bring about opening of the friction clutch by applying directly or indirectly on said at least one elastic element an actuating force directed in the opposite direction to said elastic force so as to move said at least one first friction element and at least one second friction element away from each other,
wherein said actuation unit comprises a thrust bearing, at least one force transmission member and a hollow actuating member arranged to apply said actuating force on said at least one elastic element via the thrust bearing and said at least one force transmission member, and
wherein the hollow actuating member is passed through by at least one of said first rotating member and second rotating member and is arranged on the opposite side of the hub to said at least one elastic element, characterized in that said at least one force transmission member extends through the hub.

2. The friction clutch of claim 1, wherein said at least one force transmission member is formed by a plurality of pins extending through respective axial through holes provided in the hub.

3. The friction clutch of claim 1, wherein the thrust bearing is arranged on the same of the hub as the actuating member.

4. The friction clutch of claim 1, wherein the thrust bearing is arranged on the opposite side of the hub to the actuating member.

5. The friction clutch of claim 1, wherein the driving part further comprises a clutch bell, with which said at least one first friction element is drivingly connected for rotation, and a clutch pressure member which is drivingly connected for rotation with the clutch bell and is axially movable relative to the clutch bell, said at least one elastic element being configured to act on the clutch pressure member so as to push it towards said at least one first friction element.

6. The friction clutch of claim 5, wherein said at least one elastic element is formed by a disc spring which is hinged to the clutch bell at a radially outermost edge thereof and acts on the clutch pressure member in a radially intermediate point thereof, and wherein said actuation unit is arranged to bring about opening of the friction clutch acting on a radially innermost edge of the disc spring.

7. The friction clutch of claim 5, wherein said at least one elastic element is formed by a plurality of helical springs axially interposed between the clutch bell and the clutch pressure member so as to rest at a first end thereof against the clutch bell and at the opposite end against the clutch pressure member.

* * * * *